United States Patent [19]
Welles

[11] Patent Number: 5,939,123
[45] Date of Patent: Aug. 17, 1999

[54] PROCESS FOR PREPARING WHOLE WHEAT GRAIN FOR EATING

[76] Inventor: Theodore W. Welles, 32485 Creekside Dr., Pepper Pike, Ohio 44124

[21] Appl. No.: 08/892,614

[22] Filed: Jul. 14, 1997

Related U.S. Application Data

[63] Continuation of application No. 08/517,082, Aug. 21, 1995, abandoned.

[51] Int. Cl.⁶ .................................................... A23B 9/02
[52] U.S. Cl. ......................... 426/507; 426/455; 426/460; 426/506; 426/508; 426/523; 426/615; 426/618; 426/629
[58] Field of Search ................................... 426/615, 618, 426/622, 629, 549, 523, 506, 507, 508, 449, 450, 460, 455

[56] References Cited

U.S. PATENT DOCUMENTS

| | | | |
|---|---|---|---|
| 3,132,948 | 5/1964 | Smith et al. | 99/80 |
| 3,471,298 | 10/1969 | Hirahara | 99/2 |
| 4,179,527 | 12/1979 | White | 426/508 |
| 4,435,429 | 3/1984 | Burrows et al. | 426/18 |
| 5,066,506 | 11/1991 | Creighton et al. | 426/450 |
| 5,137,745 | 8/1992 | Zukerman et al. | 426/618 |
| 5,240,728 | 8/1993 | Grenet et al. | 426/629 |

OTHER PUBLICATIONS

Nava Atlas, "The Wholefood Catalog", pp. 4,25–27, 1988.
Levin et al. "The New International Goodwill Recipe Book", p. 146, Apr. 1981.
Desrosier, N. and Desrosier, J.; The Technology of Food Preservation 4$^{th}$ Ed. AVI Publishing, 1982, pp. 110–112.

*Primary Examiner*—Lien Tran
*Attorney, Agent, or Firm*—Vickers, Daniels & Young

[57] ABSTRACT

Dry whole wheat grains are prepared for eating by preheating water to a temperature above a predetermined cooking temperature for said grains, adding a given weight of grains at ambient temperature to the preheated water to lower the temperature thereof to the cooking temperature, maintaining the water at the cooking temperature and cooking the grains at the cooking temperature for a period of time which provides for the weight of the grains to increase by from about 37.6% to about 64.1%, and then immediately cooling the cooked grains to preclude further cooking thereof.

27 Claims, No Drawings

PROCESS FOR PREPARING WHOLE WHEAT GRAIN FOR EATING

This is a continuation of application Ser. No. 08/517,082 filed Aug. 21, 1995 now abandoned.

BACKGROUND OF INVENTION

This invention relates to processing whole wheat grains and, more particularly, to a process for preparing chewable whole wheat grains for eating.

As is well known, whole wheat grains or berries comprise an outer shell of bran enclosing endosperm and wheat germ, all three of which components have significant nutritive value. In this respect, the bran is high in fiber content, and all three components are rich in vitamins and minerals. The bran shell in raw wheat is extremely hard, whereby it is impossible to chew and thus eat the whole grains in their raw state. Furthermore, the processes heretofore employed for cooking whole wheat grains in water in connection with producing an edible product including the cooked grains result in overcooking of the grains and thus a loss the valuable nutrients, namely the starches and wheat germ, through leeching thereof into the cooking water. Moreover, the whole grains so cooked have sticky outer surfaces and a somewhat mushy texture, neither of which is desirable nor acceptable with respect to directly eating the cooked grains through the use of ones fingers or the spreading of the grains on or in another edible food product. Still further, such over cooking can result in the bursting of the bran shell and thus exposure of endosperm and wheat germ, whereby the nutrient value thereof quickly dissipates.

SUMMARY OF THE INVENTION

A process is provided in accordance with the present invention by which chewable whole wheat grains are prepared from raw whole wheat in a manner which optimizes the flavor and texture of the wheat grains and the retention of the nutrient value of the three components thereof. More particularly in accordance with the invention, raw, dry whole wheat grains are cooked submerged in hot water maintained at a predetermined temperature for a predetermined cooking time which provides for softening of the bran shell so that the grains are chewable without being uncomfortably tough while, at the same time, limiting the cooking so as to preclude bursting of the shells and/or softening to the extent that the grain texture becomes mushy and/or otherwise has an undesirable mouthfeel. Moreover, the cooking process limits gelatinization of the endosperm and keeps the latter and the wheat germ sealed inside the shell so as to optimize the nutrient values of the grains. Thus, there is no leeching of starches to the surface of the bran shell which would cause the latter to have a sticky texture when picked up with the fingers and, at the same time, the endosperm is sufficiently cooked to provide for the grains to be digestible. Such control of the cooking process is achieved in accordance with the present invention by immediately cooling the cooked grains to room temperature at the end of the cooking time. Thus, any moisture diffusing to the center of the grains after cooking is cool, precluding further gelatinization of the endosperm.

Further in accordance with the present invention, the cooking process involves preheating the cooking water to a temperature above the preselected cooking temperature and then adding the raw, dry whole wheat grains to the hot water. The grains are at room temperature when added to hot water, whereby the temperature of the latter drops to and is maintained at the preselected cooking temperature for the preselected cooking time which commences immediately upon introduction of the grains into the water. Upon expiration of the cooking time, the cooked grains are immediately cooled to room temperature, such as by draining the hot water therefrom and immediately flushing the grains with cold faucet water or the like. It will be appreciated, of course, that cooling can be otherwise achieved in order to obtain the foregoing desired end result. In this respect, for example, the predetermined time for cooking at a predetermined temperature can be shortened and the grains progressively cooled thereafter in a manner and over a period of time which would be equivalent in effect to immediately pouring the hot water from the grains and flushing the latter with cooling water.

As will become apparent hereinafter, it has been found in accordance with the present invention that cooked whole wheat grains having an acceptable softness or chewability are achieved by cooking raw, dry whole wheat grains at a predetermined cooking temperature and predetermined cooking time which provides for an increase in the moisture content of the grains of from about 30% to 65% based on the weight of the raw, dry grains prior to cooking and the weight of the grains following the cooking process and, preferably, removal of moisture of the outer surfaces of the grains. As will also become apparent hereinafter, whole wheat grains cooked in accordance with the present invention so as to provide the foregoing increase in moisture content expand in volume during the cooking process by from about 50% to 100%, and have a white center count between about 43% and 100%. As is well known, if the gelatinization of starch in whole wheat grains is complete, the endosperm is translucent and, if the gelatinization is incomplete, the ungelatinized material appears as milky-white or opaque spots within the grains which are referred to as white centers. Thus, a white center count of 43% indicates incomplete gelatinization in 43% of the cooked grains and a white count of 100% indicates incomplete gelatinization in all of the cooked grains. It should be noted in connection with the latter, that a white count of 100% does not indicate no gelatinization but, rather, incomplete gelatinization. Accordingly, the cooking of whole wheat grains in accordance with the present invention cooks the starches to the point that they are digestible but not fully gelatinized.

Whole wheat grains processed in accordance with the present invention can be consumed immediately upon cooling thereof, either as a finger food snack or as an additive or ingredient in combination with other foods, such as salads, mashed potatoes, raw or cooked vegetables, and cookies, for example. The cooked grains have a shelf life of about 1–2 days, if maintained sealed such as in a plastic bag in order to optimize moisture retention. The shelf life can be increased to 3–4 days if sealed and refrigerated. Beyond this period of time, dehydration causes the grains to become progressively harder and thus not easily chewable. In lieu of immediate consumption, however, the grains can be packaged and frozen following cooling thereof and stored in the frozen condition for later consumption. Upon thawing, the grains have the same texture and flavor as those consumed immediately following the cooking process.

It is accordingly an outstanding object of the present invention to provide a method or process for cooking raw, dry whole wheat grains in hot water in a manner to produce edible whole wheat grains which are comfortably chewable and in which the endosperm and wheat germ components remain sealed within the bran shell so as to optimize the nutrient value of the cooked grains upon consumption.

DETAILED DESCRIPTION

Having generally described the various aspects of the present invention, the invention will now be more particularly described with reference to the following specific Examples.

EXAMPLE I

Each of five individual cups of raw, dry, Spring, Red whole wheat grains was cooked in hot water maintained at a temperature of 160° F. and for respective periods of 30, 40, 45, 60 and 75 minutes to determine the increase in volume of the cooked grains. In each instance, sufficient water to maintain the grains submerged during cooking was preheated to a temperature of from about 170° F. to 180° F., the dry grains at room temperature were poured into the preheated water and the water was thereafter maintained at the cooking temperature of 160° F. Immediately following expiration of the cooking time, the hot water was drained from the cooked grains and the cooked grains were cooled by flooding with cold faucet water. The five cups of grains increased in volume by from about 50% to 100% as set forth in Table A below.

Using the same cooking process, five measured weights of dry, Spring Red wheat grains were cooked respectively for 30, 40, 45, 60, and 75 minutes at a temperature of 160° F. to determine the increase in moisture content in the grains as measured by the increase in weight thereof during cooking. In each instance, following cooling of the cooked grains, the latter were spread on a towel and exposed to ambient room temperature for a period of about eight hours to remove moisture remaining on the surface thereof following cooling and thus provide a finish weight for the grains. The increase in moisture content of the grains as indicated by the increase in weight thereof was then calculated to provide the results indicated in Table B below.

TABLE A

| Time (minutes) | Cooked Vol. (cups) | Inc. in Vol.(%) |
|---|---|---|
| 30 | 1.50 | 50 |
| 40 | 1.56 | 56 |
| 45 | 1.62 | 62 |
| 60 | 1.75 | 75 |
| 75 | 2.0 | 100 |

TABLE B

| Time (minutes) | Initial Dry Wt. (grams) | Finish Wt. (grams) | Inc. in Wt. (%) |
|---|---|---|---|
| 30 | 31.54 | 43.46 | 38.7 |
| 40 | 24.10 | 34.56 | 43.4 |
| 45 | 24.63 | 37.20 | 51.0 |
| 60 | 29.26 | 45.37 | 55.1 |
| 75 | 62.32 | 102.28 | 64.1 |

With regard to the texture and taste of the grains cooked in accordance with Example I, the grains cooked for 30 to 75 minutes had good flavor and texture, with those cooked for 75 minutes being a little softer than desired. Additionally, some bursting of the bran shell was noticed when the grains were cooked for 75 minutes, but, the bursting was minimal and acceptable. The grains cooked for 40 minutes provided the best flavor and texture in Example I. Fifty grains in each of the batches cooked for 30, 40, 45, and 60 minutes to determine the increase in weight in Example I were sliced in half with a razor blade, and a white center count was made. With respect to the foregoing cooking times, white centers were found respectively in 63%, 57%, 53%, and 43% of the cooked grains.

EXAMPLE II

Each of five individual cups of raw, dry, Spring Red whole wheat grains was cooked in hot water maintained at a temperature of 200° F. and for respective periods of 5, 10, 15, 20, 25, and 30 minutes to determine the increase in volume of the cooked grains. In each instance, sufficient water to maintain the grains submerged during cooking was preheated to boiling, the dry grains at room temperature were poured into the preheated water and the water was thereafter maintained at the cooking temperature of 200° F. Immediately following expiration of the cooking time, the hot water was drained from the cooked grains and the cooked grains were flooded with cold faucet water. The five cups of grains increased in volume by from about 50% to about 110% as set forth in Table C below.

Using the same cooking process, five measured weights of dry, Spring Red whole wheat grains were cooked respectively for 5, 10, 15, 20, 25, and 30 minutes at a temperature of 200° F. to determine the increase in moisture content in the grains as measured by the increase in weight thereof during cooking. In each instance, following cooling of the cooked grains, the grains were spread on a towel and exposed to ambient room temperature for a period of about eight hours to remove moisture remaining on the surface thereof following cooling and thus provide a finish weight for the grains. The increase in moisture content of the grains as indicated by the increase in weight thereof was then calculated to provide the results indicated in Table D below.

TABLE C

| Time (minutes) | Cooked Vol. cups | Inc. in Vol.(%) |
|---|---|---|
| 5 | 1.50 | 50 |
| 10 | 1.66 | 66 |
| 15 | 1.75 | 75 |
| 20 | 1.90 | 90 |
| 25 | 2.0 | 100 |
| 30 | 2.10 | 110 |

TABLE D

| Time minutes | Initial Dry Wt. (grams) | Finish Wt. (grams) | Inc. in Wt. (%) |
|---|---|---|---|
| 5 | 48.59 | 63.36 | 30.4 |
| 10 | 50.53 | 69.54 | 37.6 |
| 15 | 49.12 | 70.48 | 45.5 |
| 20 | 49.55 | 74.57 | 50.5 |
| 25 | 51.05 | 79.56 | 55.8 |
| 30 | 51.95 | 83.01 | 59.8 |

With regard to the texture and taste of the grains cooked in accordance with Example II. the grains cooked for 10 to 30 minutes had good flavor and texture, and those cooked for 5 minutes were too hard to chew comfortably. The grains cooked for 10 to 25 minutes had better texture than those cooked for 30 minutes, and the grains cooked for 15 minutes provided the best texture and flavor. Some bursting of the grains was notice when the grains were cooked for 30 minutes, but the bursting was minimal and acceptable. Fifty grains in each of the batches cooked for 10, 15, 20, 25, and 30 minutes to determine increase in weight in Example II were sliced in half with a razor blade, and a white center count was made. With respect to the foregoing cooking times, white centers were found respectively in 100%, 100%, 90%, 80%, and 60% of the cooked grains.

In comparing the results of Examples I and II, it will be noted with respect to texture and flavor that in the time and temperature ranges which produced the most acceptable end product, the moisture content as determined by weight increase closely correlates between the two examples. In this respect, grains cooked at 160° F. for 30 to 60 minutes had a weight increase of from 38.7% to 55.1% and the grains cooked at 200° F. for 10 to 25 minutes had a weight increase of from 37.6% to 55.8%. Moreover, the 160° F. and 200° F. cooking times which produced the best flavor and texture, namely 40 and 15 minutes, respectively, had a weight increase 43.4 and 43.5, respectively. At the same time, the increase in volume does not correlate as closely as does the increase in weight and, in this respect, for the best flavor and texture cooking at 160° F. for 40 minutes only increases the volume by 56% whereas cooking at 200° F. for 15 minutes increases the volume by 75%. It is noted too, in comparing the two examples, that cooking at 200° F. considerably increases the percentage of white centers, thus indicating that cooking at a higher temperature for a shorter period of time may result in cooked grains being more difficult to digest. In any event, the examples show that whole, dry wheat grains cooked in hot water at a given temperature for a given time to provide an increase in weight of from about 37.6% to about 55.8% result in an edible product having a texture which is firm but neither tough to chew nor mushy and in which the flavor and retention of nutrient value are optimized by precluding the loss of endosperm and wheat germ by stopping the cooking before the bran shell bursts.

Although the present invention has been described with respect to various specific embodiments, various modifications will be apparent from the disclosure and are intended to be within the scope of the following claims.

Having thus described the invention, I claim:

1. A process for preparing whole wheat grains for eating consisting of, cooking a predetermined weight of said grains in hot water at a temperature of one of 160° F. and 200° F. for a period of time for said weight to be increased by from about 37.6% to about 64.1% by absorption of water, immediately cooling the cooked grains to preclude further cooking thereof, and then drying the cooked grains.

2. The process according to claim 1, wherein said cooling comprises draining said hot water from said cooked grains and applying cold water to the drained grains.

3. The process according to claim 1, wherein said hot water is maintained at a temperature of about 160° F. during said cooking.

4. A process according to claim 3, wherein said period of time is from about thirty minutes to about seventy-five minutes.

5. The process according to claim 3, wherein said period of time is from about thirty minutes to about sixty minutes.

6. The process according to claim 3, wherein said period of time is about forty minutes.

7. The process according to claim 3, wherein said grains are cooked until said weight is increased by from about 38.7% to about 55.1%.

8. The process according to claim 3, wherein said grains are cooked until said weight is increased by about 43.4%.

9. The process according to claim 1, wherein said hot water is maintained at a temperature of 200° F. during said cooking.

10. The process according to claim 9, wherein said period of time is from about ten minutes to about thirty minutes.

11. The process according to claim 9, wherein said period of time is about ten minutes to about twenty-five minutes.

12. The process according to claim 9, wherein said period of time is about fifteen minutes.

13. The process according to claim 9, wherein said grains are cooked until said predetermined weight is increased by from about 37.6% to about 59.8%.

14. The process according to claim 9, wherein said grains are cooked until said predetermined weight is increased by from about 37.6% to about 55.8%.

15. The process according to claim 9, wherein said grains are cooked until said predetermined weight is increased by about 43.5%.

16. A process for preparing whole wheat grains for eating consisting of, preheating water to a temperature above a predetermined cooking temperature for said grains of one of 160° F. and 200° F., adding a given weight of said grains at ambient temperature to said preheated water to lower the temperature thereof to said cooking temperature, maintaining said water at said cooking temperature and cooking said grains at said cooking temperature for a period of time for said given weight of said grains to increase by from about 37.6% to about 64.1% by absorption of water, immediately cooling the cooked grains to preclude further cooking thereof and then drying the cooled grains.

17. The process according to claim 16, wherein said cooking temperature of said water is 160° F.

18. The process according to claim 17, wherein said period of time is from about thirty minutes to about sixty minutes.

19. The process according to claim 18, wherein said period of time is about forty minutes.

20. The process according to claim 16, wherein said cooking is for a period of time for said given weight of said grains to increase by from about 38.7% to about 55.1%.

21. The process according to claim 16, wherein said cooking is for a period of time for said given weight of said grains to increase by about 43.4%.

22. The process according to claim 16, wherein said cooking temperature of said water is 200° F.

23. The process according to claim 22, wherein said period of time is from about ten minutes to about thirty minutes.

24. The process according to claim 22, wherein said period of time is from about ten minutes to about twenty-five minutes.

25. The process according to claim 22, wherein said period of time is about fifteen minutes.

26. The process according to claim 22, wherein said cooking is for a period of time for said given weight of said grains to increase from about 37.6% to about 55.8%.

27. The process according to claim 22, wherein said cooking is for a period of time for said given weight of said grains to increase by about 43.5%.

* * * * *